Nov. 5, 1968 R. M. BOYLE ET AL 3,409,349
GONIOSCOPIC CONTACT LENS DEVICE HAVING
A FLEXIBLE SCLERAL FLANGE
Filed Aug. 31, 1964

INVENTORS
ROBERT M. BOYLE
BY STEPHEN F. BOYLE

ATTORNEY

United States Patent Office 3,409,349
Patented Nov. 5, 1968

3,409,349
GONIOSCOPIC CONTACT LENS DEVICE HAVING A FLEXIBLE SCLERAL FLANGE
Robert M. Boyle and Stephen F. Boyle, Oakland, Calif., assignors, by mesne assignments, to Stephen F. Boyle, Oakland, Calif.
Filed Aug. 31, 1964, Ser. No. 393,067
2 Claims. (Cl. 351—6)

ABSTRACT OF THE DISCLOSURE

A direct viewing gonioscopic device is provided with a transparent contact lens, a scleral flange, and a tab portion integral with the flange which may be pulled away a sufficient distance from the lens to create an air passage from the eye through a gap between the lens and the flange to the atmosphere.

---

This invention relates to an optical instrument and in particular to a direct viewing gonioscopic device.

Rays of light reflecting from certain internal portions of the eye such as the anterior ciliary body, the peripherals iris and others cannot be seen by a trained and skilled observer like an ophthalmologist without the use of an optical instrument. These rays strike the cornea of the eye at a critical angle and undergo complete internal reflection. In order for these rays to be seen, the corneal curve must be neutralized or changed by means of contact lenses. Thus, every thorough eye examination, especially when there is an indication of present eye disease, requires the use of some sort of diagnostic contact lens. In addition, certain kinds of diagnostic contact lenses are essential to accurate eye surgery.

One type of lens useful in work of this nature is commonly referred to as a direct viewing gonioscopic contact lens. A lens in this category has an outside radius of curvature which is greater than that of the cornea, thereby permitting the rays of light to be observed directly by the examiner instead of being completely internally reflected back into the eye. A slit lamp is ofttimes used in conjunction with a gonioscopic contact lens to help in studying the configuration of the light angles.

Various designs of direct viewing gonioscopic contact lenses have been used in the past to view internal rays of light reflected from within the eye. However, these structures have not proven entirely satisfactory as the lens has remained difficult to manipulate in the eye, has required an additional instrument to hold it in place, and has allowed annoying air bubbles to frequently form between the lens and cornea. In addition, the patient has been required to be examined in the recumbent position, which is not always desired. Another diagnostic contact lens on the market utilizes a negative pressure in the form of a vacuum brought about by a suction device to keep the lens on the eye with the patient in an upright position, but this device has the disadvantage that a too powerful vacuum may be easily created resulting in physiologic side effects and a serious error in diagnosis.

The invention in this application overcomes all of the above problems by providing a direct viewing gonioscopic device having a transparent contact lens and a scleral flange encircling a portion of and extending below the lens with a tab portion on the flange for adjusting the device on and removing the device from the eye.

The primary object of this invention is to provide a new and improved direct viewing gonioscopic device.

Another object of the invention is to provide a direct viewing gonioscopic device which is relatively simple in design and construction.

Another object is to provide structure of the character described which will stay in position on the eye without use of an instrument and will stay in place whether the patient is in an upright or reclining position without any assistance.

A further object of the invention is to provide a direct viewing gonioscopic device wherein there is less opportunity for air bubbles to collect under the lens.

A still further object is to provide means on the device for releasing any suction pressure before removal from the eye.

Other features, objects and advantages of the present invention will be apparent from the following description of a preferred embodiment illustrated in the accompanying drawing in which.

In accordance with the present invention, a direct viewing gonioscopic device is provided with a transparent contact lens having an upper outer convex spherical surface and a generally frusto-conical portion terminating in a lower inner concave surface corresponding generally to the shape of the cornea of an eye. A scleral flange has an upper portion which encircles a portion of the lens and a lower portion which is adapted to fit against the eyeball and beneath the eyelids. Means are provided on the flange for adjusting the device on an eye and for releasing any suction pressure between the eye and the device before removal from the eye.

Figure 1:
FIGURE 1 is a schematic view illustrating the direct viewing gonioscopic device in position on an eye.
Figure 2:
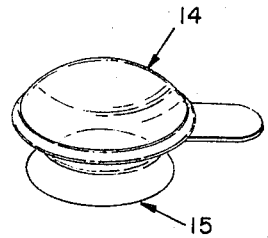
FIGURE 2 is an isometric view of a direct viewing gonioscopic device embodying the invention therein.

In the exemplary embodiment of the invention as disclosed in the drawing, a direct viewing gonioscopic device, generally designated 10, is adapted to be worn on the sclera 11 of an eye generally designated 12 in front of the cornea 13 as shown in FIGURE 1. As shown in FIGURE 2, the direct viewing gonioscopic device 10 has a transparent contact lens, generally designated 14, and a scleral flange, generally designated 15.

Figure 3:
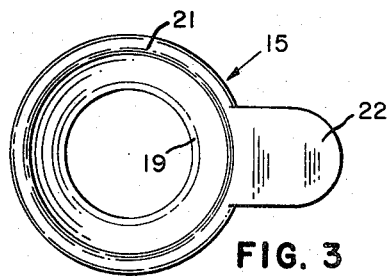
FIGURE 3 is a top plan view of the scleral flange.
Figure 4:
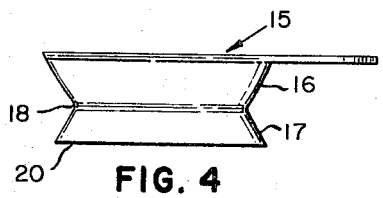
FIGURE 4 is a side view of the scleral flange.

Referring particularly to FIGURES 3 and 4, the scleral flange 15 is primarily circular in shape and has an upper frusto-conical portion 16 and a lower frusto-conical portion 17. The frusto-conical portions 16 and 17 are divergent and meet intermediate of the flange at 18 with an inner ledge 19 being located within the flange 15 at that point. The bottom portion 20 of the lower frusto-conical portion 17 contacts the sclera 11 of the eye 12 when in proper position. The upper frusto-conical portion 16 has an inner rib 21 at the top thereof and has integral therewith a tab portion 22 which will be discussed in detail hereinafter.

The scleral flange is preferably formed in a one piece construction from a flexible material such as rubber or the like. A silicone rubber identical or similar to that used for making artificial heart valves has been found to operate very satisfactorily.

Figure 5:
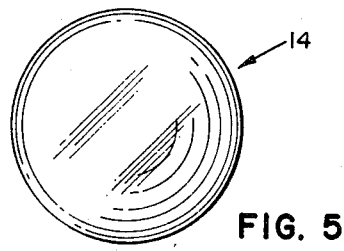
FIGURE 5 is a top plan view of the transparent contact lens.
Figure 6:
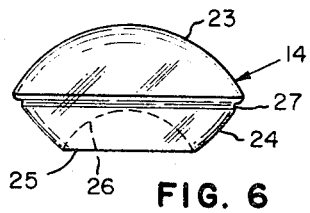
FIGURE 6 is a side view partially in section of the transparent contact lens illustrating the inner concave surface.

As shown in FIGURES 5 and 6, the transparent contact lens 14 has an upper outer convex spherical surface 23 which is preferably polished and occupies approximately half of the lens. A generally frusto-conical portion 24 occupies most of the lower portion of the lens 14 and terminates in a bottom segment 25 from which a lower inner concave surface 26 rises upwardly to correspond generally to the shape of the cornea 13 of an eye 12 and is ground to permit proper contact with the eye if such occurs. At the top of the frusto-conical portion 24 is a circumferential exterior groove 27 completely around the lens 14.

The integral lens must be made of a highly transparent material. Crown glass which can be cleaned without scratching may be used, if desired. Also available is high grade plastic which is highly scratch resistant and also has excellent optical clarity. High quality plastic of this type has the same refractive index as crown glass and allows more light transmission. Additionally, a lens of high grade plastic weighs appreciably less than a glass lens—somewhere in the neighborhood of about half of what a glass lens weighs.

Figure 7:
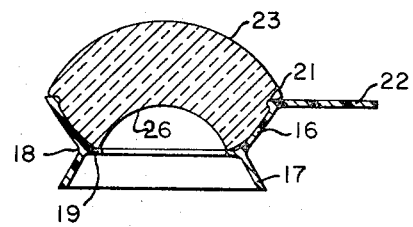
FIGURE 7 is a side view in section of the device illustrating the relationship between the flange and the contact lens.

When the lens 14 and flange 15 are assembled together as shown in FIGURE 7 the frusto-conical portion 24 of the lens nests within the upper frusto-conical portion 16 of the flange with inner rib 21 of the flange mating with the exterior groove 27 of the lens and the bottom segment 25 of the lens contacting the inner ledge 19 of the flange. The area defined by the inner ledge 19 corresponds approximately to the area of bottom segment 25.

In actual operation, the direct viewing gonioscopic device 10 of this invention is put on an anesthetised eye. The bottom edge or portion 20 of the lower frusto-conical portion 17 contacts the sclera around the cornea and holds the eyelids apart thereby exposing the cornea for observation. In addition, the bottom portion 20 provides a liquid chamber whereby the eye may be flooded with a solution such as a normal saline solution in order to neutralize the refractive surfaces of the cornea. This is accomplished by using the flange tab portion 22 to raise one side of the bottom portion 20 away from the sclera and introducing the saline solution therein.

During examination the lens follows the eye in all directions of gaze, the lens being in direct contact or in close contiguity with the cornea. Because the flange is constructed of a very flexible and pliable material which is shaped and angled to conform to the scleral curvature, there is only a small possibility of forming air bubbles, even when the patient makes unexpected movements which, with structures known in the art, would inevitably suck in air. The tab portion 22 is also available for evenly adjusting the lens on the eye during this time.

It is often possible for suction pressures to build up between the eye and the device in the course of the examination. The tab portion 22 may also be used to release any pressure which might exist before removal of the device from the eye. This is accomplished by pulling the tab portion 22 a sufficient distance away and perpendicular from the exterior groove 27 of the lens to create an air passage from the eye through a gap between the lens and the flange to the atmosphere. The tab portion 22 can then be returned to its normal position and used to safely remove the device from the eye.

The tab portion 22 is of such a size as to be easily gripped by the fingers but is small enough to not interfere with the examination or inconvenience the patient.

The unique combination of the flange and lens of this invention allows one standard size direct viewing gonioscopic device to take the place of a plurality of prior art structures because the flexible scleral flange will adjust itself to the curvature and size of the sclera of practically all patients. It should also be understood that the flexible scleral flange of this invention could be used with other types of diagnostic devices to provide means for not only adjusting the device on and removing the device from an eye but also for releasing any suction pressure between an eye and the device before removal of the device from an eye.

While we have shown and described one embodiment of our invention, it is to be understood that it is capable of many modifications. Changes, therefore, in the construction and arrangement may be made without departing from the spirit and scope of the invention as defined in the appended claims.

We claim as our invention:

1. A direct viewing gonioscopic device for insertion in and observation of an eye, comprising: an integral annular flexible scleral flange having an upper frusto-conical portion and a lower frusto-conical portion, said frusto-conical portions being divergent and meeting intermediate of said flange, an inner ledge within said flange, an inner rib around the top of said upper frusto-conical portion; and a transparent contact lens having an upper outer polished convex spherical surface, a generally frusto-conical portion terminating in a lower inner concave surface corresponding generally to the shape of the cornea of the eye and an exterior groove around the top of said frusto-conical portion whereby when said lens and said flange are assembled together said lens frusto-conical portion nests within said flange upper frusto-conical portion with said flange inner rib mating with said lens exterior groove and said flange inner ledge contacting the bottom of said lens, and an integral means for releasing any suction pressure between the eye and the device before removal therefrom.

2. The direct viewing gonioscopic device of claim 1 wherein the suction releasing means is at least one tab portion extending from said flange which may be pulled away a sufficient distance from said lens to create an air passage from the eye through a gap between said lens and said flange to the atmosphere.

References Cited

UNITED STATES PATENTS

| 2,117,770 | 5/1938 | Row | 351—160 |
| 2,247,628 | 7/1941 | Beitel | 351—160 |
| 3,102,157 | 8/1963 | Gamber | 351—160 |
| 3,228,741 | 1/1966 | Becker | 351—160 |

FOREIGN PATENTS

| 222,917 | 2/1958 | Australia. |

OTHER REFERENCES

Ellis, "A New Goniotomy Lens," vol. 27, Am. Jour. of Ophthalmology, pp. 1258–60 (November 1944) (Photo-copy in 351/160); Troncoso, "Improved Tubular Goniolens for Gonioscopic Examination," vol. 34, Am. Jour. of Ophthalmology, pp. 282–83 (February 1951) (Photo-copy in 351/160); Worst, "Low Vacuum Diagnostic Contact Lenses," vol. 51, Am. Jour. of Ophthalmology, pp. 410–24 (March 1961) (Photo-copy in 351/160); Worst, "Direct and Indirect Image Gonioscopy," vol. 54, Am. Jour. of Ophthalmology, pp. 243–49 (August 1962) (Photo-copy in 351/160); Jenkin, "Special Forms of Contact Lenses," vol. 145, Am. Jour. of Ophthalmology, pp. 369–72 (April 1963) (Photo-copy in 351/160).

DAVID H. RUBIN, *Primary Examiner.*

W. L. BROWN, *Assistant Examiner.*